(12) United States Patent
Hsu et al.

(10) Patent No.: US 6,738,522 B1
(45) Date of Patent: May 18, 2004

(54) EFFICIENT SIMD QUANTIZATION METHOD

(75) Inventors: Wei-Lien Hsu, Austin, TX (US); Travis Wheatly, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 562 days.

(21) Appl. No.: 09/776,077

(22) Filed: Feb. 1, 2001

(51) Int. Cl.$^7$ ................................................ G06K 9/36
(52) U.S. Cl. ............. 382/234; 358/426.14; 375/240.03; 382/251; 712/22
(58) Field of Search .................. 382/166, 234–237, 382/251–253, 302, 304; 345/27; 358/426.01, 426.14; 704/221, 222, 230; 712/10, 16, 20, 22, 32, 34; 375/240.01–240.29

(56) References Cited

U.S. PATENT DOCUMENTS

| | | | |
|---|---|---|---|
| 5,915,044 A | * 6/1999 | Gardos et al. | ............... 382/236 |
| 6,298,162 B1 | * 10/2001 | Sutha et al. | ................. 382/234 |
| 6,462,837 B1 | * 10/2002 | Tone | .......................... 358/3.01 |
| 6,529,554 B1 | * 3/2003 | Craver | .................. 375/240.23 |

OTHER PUBLICATIONS

William B. Pennebaker & Joan L. Mitchell, "JPEG: Still Image Data Compression Standard," Published by Van Nostrand Reinhold, 1992, pp. 34–38.*
James Abel & Kumar Balasubramanian, "Applications Tuning for Streaming SIMD Extensions," Intel Technology Journal Q2, 1999.*
Morten V. Jensen & Brian Nielsen, "Real–Time Layered Video Compression Using SIMD Computation," Basic Research in Computer Science, Dec. 1998.*
*Intel Architecture Software Developer's Manual, vol. 2: Instruction Set Reference*, 1999.
"Enhanced 3DNow!™ Technology for the AMD Athlon™ Processor," Aug. 2000, pp. 1–11.
"Inside 3DNow!™ Technology," ©2001 Advanced Micro Devices, Inc., pp. 1–4.
"3DNow!™ Technology in Microsoft DirectX 6.x," ©2001 Advanced Micro Devices, Inc. pp. 1–6.
"3DNow!™ Fact Sheet," ©2001 Advanced Micro Devices, Inc., p. 1.
"AMD 3DNow!™ Frequently Asked Questions," ©2001 Advanced Micro Devices, p. 1.
*3DNow!™ Technology Manual*, ©2000 Advanced Micro Devices, Inc., pp. 1–62.
*AMD Extensions to the 3DNow!™ and MMX™ Instructions Sets Manual*, ©2000 Advanced Micro Devices, pp. 1–36.

* cited by examiner

*Primary Examiner*—Bhavesh M. Mehta
*Assistant Examiner*—Yubin Hung
(74) *Attorney, Agent, or Firm*—Meyertons Hood Kivlin Kowert & Goetzel, P.C.; B. Noël Kivlin

(57) ABSTRACT

A method of quantizing multiple input values in parallel using SIMD instructions is disclosed. In one embodiment, the method comprises (1) receiving a set of input values Xi; (2) operating on the set of input values to produce a set of binary mask values Ki that are related to the input values Xi by Ki=−1 if Xi>0, and Ki=0 if Xi<0; (3) adding half of a quantization step Q to the input values Xi to obtain sum values; (4) subtracting half of a quantization step Q to the input values Xi to obtain difference values; (5) using the binary mask values to screen out sum values calculated from negative input values; (6) using a complementary binary mask to screen out difference values calculated from positive input values; and (7) combining the screened sum and difference values to determine prequantization values Yi that can be expressed Yi=Xi+Q/2 if Xi>0, and Yi=Xi−Q/2 if Xi≦0. The prequantization values may then be converted to floating point format, divided by Q, and restored to integer format to obtain the desired quantization values. Each of these operations can be performed in parallel on each of the values in the set using SIMD instructions.

22 Claims, 3 Drawing Sheets

EFFICIENT SIMD QUANTIZATION METHOD

BACKGROUND OF THE INVENTION

1. Field of the Invention

The present invention relates generally to systems and methods for performing quantization such as might be required for data compression. More particularly, the present invention relates to an efficient method of using single-instruction, multiple-data (SIMD) instructions to perform quantization.

2. Description of the Related Art

As multimedia applications become more sophisticated, they demand increasing amounts of storage and transmission bandwidth. To combat this tendency, multimedia systems use various types of audio/visual compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the two-dimensional discrete cosine transform (2D-DCT). The frequency domain characteristics of a picture frame generally allow for easy removal of spatial redundancy and efficient encoding of the frame. One video data compression standard for still graphic images is JPEG (Joint Photographic Experts Group) compression. JPEG compression is actually a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the 2D-DCT. Examples of video compression which use an interframe compression technique are MPEG (Moving Pictures Experts Group), DVI and Indeo, among others.

MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the 2D-DCT. After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the 2D-DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse 2D-DCT to convert the data from the frequency domain back to the pixel domain. The MPEG decoder also performs motion compensation using the transmitted motion vectors to recreate the temporally compressed frames.

Quantization is an important part of many compression techniques, including the JPEG and MPEG compression standards. For color images, the quantization step must be performed between two and three times per pixel, depending on the compression technique. As a result, the quantization step may easily need to be performed more than 15 million times per second when compressing video images in real time.

Traditional x86 processors are not well adapted for the types of calculations used in signal processing. Thus, signal processing software applications on traditional x86 processors have lagged behind what was realizable on other processor architectures. There have been various attempts to improve the signal processing performance of x86-based systems. For example, microcontrollers optimized for digital signal processing computations (DSPs) have been provided on plug-in cards or the motherboard. These microcontrollers operated essentially as hardwired coprocessors enabling the system to perform signal processing functions.

As multimedia applications become more sophisticated, the demands placed on computers are redoubled. Microprocessors are now routinely provided with enhanced support for these applications. For example, many processors now support single-instruction multiple-data (SIMD) commands such as MMX instructions. Advanced Micro Devices, Inc. (hereinafter referred to as AMD) has proposed and implemented 3DNow!™, a set of floating point SIMD instructions on x86 processors starting with the AMD-K6®-2. The AMD-K6®-2 is highly optimized to execute the 3DNow!™ instructions with minimum latency. Software applications written for execution on the AMD-K6®-2 may use these instructions to accomplish signal processing functions and the traditional x86 instructions to accomplish other desired functions.

The 3DNow! instructions, being SIMD commands, are "vectored" instructions in which a single operation is performed on multiple data operands. Such instructions are very efficient for graphics and audio applications where simple operations are repeated on each sample in a stream of data. SIMD commands invoke parallel execution in superscalar microprocessors where pipelining and/or multiple execution units are provided.

Vectored instructions typically have operands that are partitioned into separate sections, each of which is independently operated upon. For example, a vectored multiply instruction may operate upon a pair of 32-bit operands, each of which is partitioned into two 16-bit sections or four 8-bit sections. Upon execution of a vectored multiply instruction, corresponding sections of each operand are independently multiplied. So, for example, the result of a vectored multiplication of [3;5] and [7;11] would be [21;55]. To quickly execute vectored multiply instructions, microprocessors such as the AMD-K6°-2 use a number of multipliers in parallel.

FIG. 1 illustrates one embodiment of a representative computer system 100 such as the AMD-K6®-2 which is configured to support the execution of general-purpose instructions and parallel floating-point instructions. Computer system 100 may comprise a microprocessor 110, memory 112, bus bridge 114, peripheral bus 116, and a plurality of peripheral devices P1-PN. Bus bridge 114 couples to microprocessor 110, memory 112 and peripheral bus 116. Bus bridge 114 mediates the exchange of data between microprocessor 110, memory 112 and peripheral devices P1-PN.

Microprocessor 110 is a superscalar microprocessor configured to execute instructions in a variable length instruction set. A subset of the variable length instruction set is the set of SIMD (simultaneous-instruction multiple-data) floating-point instructions. Microprocessor 110 is optimized to execute the SIMD floating-point instructions in a single clock cycle. In addition, the variable length instruction set includes a set of x86 instructions (e.g. the instructions defined by the 80486 processor architecture).

Memory 112 stores program instructions which control the operation of microprocessor 110. Memory 112 additionally stores input data to be operated on by microprocessor 110, and output data generated by microprocessor 110, in response to the program instructions. Peripheral devices P1-PN are representative of devices such as network interface cards (e.g. Ethernet cards), modems, sound cards, video acquisition boards, data acquisition cards, external storage media, etc. Computer system 100 may be a personal computer, a laptop computer, a portable computer, a television, a radio receiver and/or transmitter, etc.

FIG. 2 illustrates one embodiment for microprocessor 110. Microprocessor 110 may be configured with 3DNow!™ and MMX® technologies. Microprocessor 110 may comprise bus interface unit 202, predecode unit 204, instruction cache 206, decode unit 208, execution engine 210, and data cache 214. Microprocessor 110 may also include store queue 212 and an L2 cache 216. Additionally, microprocessor 110 may include a branch prediction unit and a branch resolution unit (not shown) to allow efficient speculative execution.

Predecode unit 204 may be coupled to instruction cache 206, which stores instructions received from memory 112 via bus interface unit 202 and predecode unit 204. Instruction cache 206 may also contain a predecode cache (not shown) for storing predecode information. Decode unit 208 may receive instructions and predecode information from instruction cache 206 and decode the instructions into component pieces. The component pieces may be forwarded to execution engine 210. The component pieces may be RISC operands. (Microprocessor 110 may be RISC-based superscalar microprocessor). RISC ops are fixed-format internal instructions, most of which are executable by microprocessor 110 in a single clock cycle. RISC operations may be combined to form every function of the x86 instruction set. Execution engine 210 may execute the decoded instructions in response to the component pieces received from decode unit 208. As shown in FIG. 3, execution engine 210 may include a scheduler buffer 302 coupled to receive input from decode unit 208. Scheduler buffer 302 may be configured to convey decoded instructions to a plurality of execution pipelines 306–314 in accordance with input received from instruction control unit 304. Execution pipelines 306–314 are representative, and in other embodiments, varying numbers and kinds of pipelines may be included.

Instruction control unit 304 contains the logic necessary to manage out of order execution of instructions stored in scheduler buffer 302. Instruction control unit 304 also manages data forwarding, register renaming, simultaneous issue and retirement of RISC operations, and speculative execution. In one embodiment, scheduler buffer 302 holds up to 24 RISC operations at one time. When possible, instruction control unit 304 may simultaneously issue (from buffer 302) a RISC operation to each available execution unit.

Execution pipelines 306–315 may include load unit 306, store unit 308, X pipeline 310, Y pipeline 312, and floating point unit 314. Load unit 306 may receive input from data cache 214, while store unit 308 may interface to data cache 214 via a store queue 212. Store unit 308 and load unit 306 may be two-staged pipeline designs. Store unit 308 may perform memory writes. For a memory write operation, the store unit 308 may generate a physical address and the associated data bytes which are to be written to memory. These results (i.e. physical address and data bytes) may be entered into the store queue 212. Memory read data may be supplied by data cache 214 or by an entry in store queue 212 (in the case of a recent store).

X pipeline 310 and Y pipeline 312 may each include a combination of integer, integer SIMD (e.g. MMX®), and floating-point SIMD (e.g. 3DNOW!™) execution resources. Some of these resources may be shared between the two register pipelines. As suggested by FIG. 3, load unit 306, store unit 308, and pipelines 310, 312 may be coupled to a set of registers 316 from which these units are configured to read source operands. In addition, load unit 306 and pipelines 310, 312 may be configured to store destination result values to registers 316. Registers 316 may include physical storage for a set of architected registers.

Floating point unit 314 may also include a set of floating point registers (not shown separately). Floating point unit 314 may execute floating point instructions (e.g. x87 floating point instructions, or IEEE 754/854 compliant floating point instructions) designed to accelerate the performance of scientific software. Floating point unit 314 may include an adder unit, a multiplier unit, and a divide/square-root unit, etc. Floating point unit 314 may operate in a coprocessor-like fashion, in which decode unit 208 directly dispatches the floating point instructions to unit 314. The floating point instructions may still be allocated in scheduler buffer 302 to allow for in-order retirement of instructions. Unit 314 and scheduler buffer 302 may communicate to determine when a floating point instruction is ready for retirement.

Pipelines 310, 312 include resources that allow them to perform scalar integer operations, SIMD integer operations, and SIMD floating point operations. The SIMD integer operations that are performed correspond to the MMX® instruction set architecture, and the SIMD floating point operations that are performed correspond to the 3DNow!™ instruction set. Any pair of operations which do not require a common resource may be simultaneously executed in the two pipelines (i.e. one operation per pipeline). Thus, the maximum rate of execution for the two pipelines taken together is equal to two operations per cycle.

Registers 316 may include registers which are configured to support packed integer and packed floating-point operations (e.g. registers denoted MM0 through MMn which conform to the 3DNow!™ and MMX® instruction set architectures). In one embodiment of microprocessor 110, there are eight MM registers, i.e. MM0 through MM7, each having a 64 bit storage capacity. Two 32-bit floating point operands may be loaded into each MM register in a packed format. For example, suppose register MM0 has been loaded with floating-point operands A and B, and register MM1 has been loaded with floating-point operands C and D. In shorthand notation, this situation may be represented by the expressions MM0=[A:B] and MM1=[C:D], where the first argument in a bracketed pair represents the high-order 32 bits of a quadword register, and the second argument represents the low-order 32 bits of the quadword register. The 3DNow!™ instructions invoke parallel floating-point operations on the contents of the MM registers. For example, the 3DNow!™ multiply instruction given by the assembly language construct "pfmul MM0,MM1" invokes a parallel floating-point multiply on corresponding components of MM0 and MM1. The two floating-point resultant values of the parallel multiply are stored in register MM0. Thus, after the instruction has completed execution, register MM0 may be represented by the expression MM0=[A*C:B*D]. As used herein, the assembly language construct "pfxxx MMdest, MMsrc"

implies that a 3DNow!™ operation corresponding to the mnemonic pfxxx uses registers MMdest and MMsrc as source operands, and register MMdest as a destination operand.

The assembly language construct

"pfadd MM0,MM1"

invokes a parallel floating-point addition on corresponding components of registers MM0 and MM1. Thus, after this instructions has completed execution, register MM0 may be represented by the expression MM0=[A+C:B+D]. Various MMX and 3DNow! instructions are described in greater detail in AMD's "3DNow! Technology Manual" and AMD's "AMD Extensions to the 3DNow! and MMX Instruction Sets Manual", both of which are incorporated herein by reference.

It is noted that alternate embodiments of microprocessor 110 are contemplated where the storage capacity of an MM register allows for more than two floating-point operands. For example, an embodiment of microprocessor 110 is contemplated where the MM registers are configured to store four 32-bit floating-point operands. In this case, the MM registers may have a size of 128-bits.

Video compression operations in multimedia systems generally require a large amount of processing. For example, hundreds of multiplication (or division) operations as well as hundreds of addition (or subtraction) operations may be required to perform the 2D-DCT or IDCT upon a single 8×8 array. Such computational requirements can be extremely time-consuming and resource intensive when hundred of thousands of 8×8 blocks are processed every second.

A new system and method are desired for efficiently performing compression in multimedia systems. It is particularly desirable to perform repeated, low-level operations such as quantization as efficiently as possible to minimize computational requirements and make such compression feasible in a general purpose computer system.

SUMMARY OF THE INVENTION

The problems outlined above are in large part solved by a method of quantizing multiple input values in parallel using SIMD instructions. In one embodiment, the method comprises (1) receiving a set of input values $X_i$; (2) operating on the set of input values to produce a set of binary mask values $K_i$ that are related to the input values $X_i$ by $K_i=-1$ if $X_i>0$, and $K_i=0$ if $X_i \leq 0$; (3) adding half of a quantization step Q to the input values $X_i$ to obtain sum values; (4) subtracting half of a quantization step Q to the input values $X_i$ to obtain difference values; (5) using the binary mask values to screen out sum values calculated from negative input values; (6) using a complementary binary mask to screen out difference values calculated from positive input values; and (7) combining the screened sum and difference values to determine prequantization values $Y_i$ that can be expressed $Y_i=X_i+Q/2$ if $X_i>0$, and $Y_i=X_i-Q/2$ if $X_i \leq 0$. The prequantization values may then be converted to floating point format, divided by Q, and restored to integer format to obtain the desired quantization values. Each of these operations can be performed in parallel on each of the values in the set using SIMD instructions such as packed word add with saturation (PADDSW), packed word subtract with saturation (PSUBSW), packed compare word for greater than (PCMPGTW), packed floating point to packed double-word integer (PF2ID), and packed word integer to packed floating point (PI2FW).

BRIEF DESCRIPTION OF THE DRAWINGS

A better understanding of the present invention can be obtained when the following detailed description of the preferred embodiment is considered in conjunction with the following drawings, in which.

Figure 1:
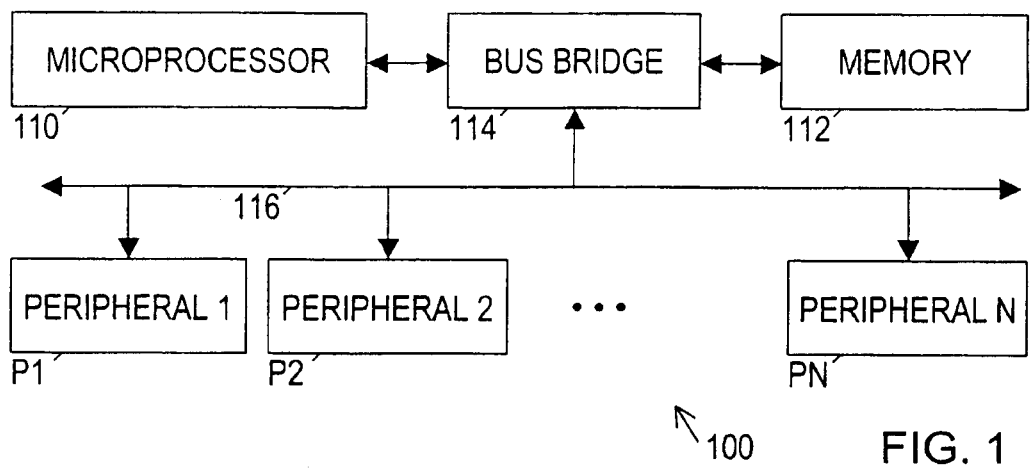
FIG. 1 shows one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

TERMINOLOGY

As used herein, the term multimedia instruction refers to the above described packed integer operations (e.g. operations such as those defined by the MMX instructions within the x86 instruction set) and to packed floating point operations optimized for three dimensional graphics calculations and/or physics calculations (e.g. operations such as those defined by the 3DNow! instructions). These instructions may be defined to operate, for example, on two 32-bit floating point numbers packed into a given multimedia register. Other packed floating point formats may be used as well.

DETAILED DESCRIPTION OF PREFERRED EMBODIMENTS

Figure 4:
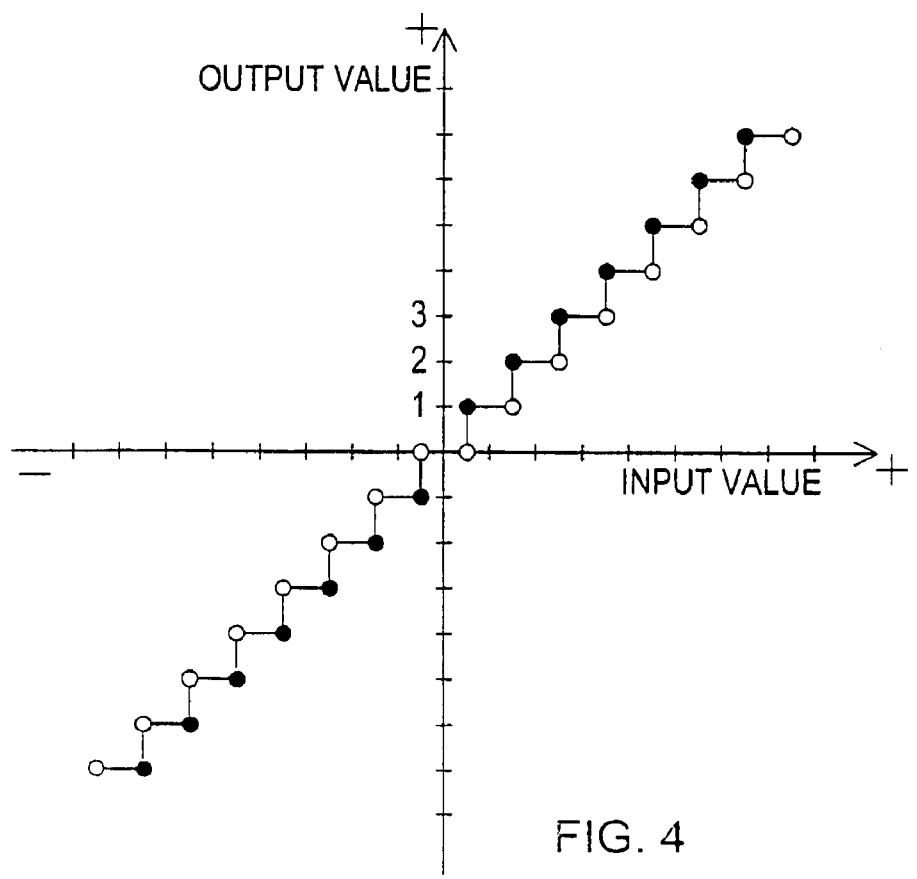
FIG. 4 shows a graph of a quantization function.

Turning now to FIG. 4, a quantization function preferred for some compression algorithms is shown. As with all quantization functions, each input value on the horizontal axis is assigned one of a set of discrete output values on the vertical axis. For this quantization function, the output values are equally spaced with a quantization step Q, and zero is included in the set of output values. This quantization function quantizes the input values to the nearest output value, thereby minimizing quantization error. The halfway points (those points equidistant from two output values) are quantized to the output value having the larger magnitude (i.e. quantized away from zero). This quantization function is therefore a symmetric function as well as a quantization-error minimizing function.

Figure 5:
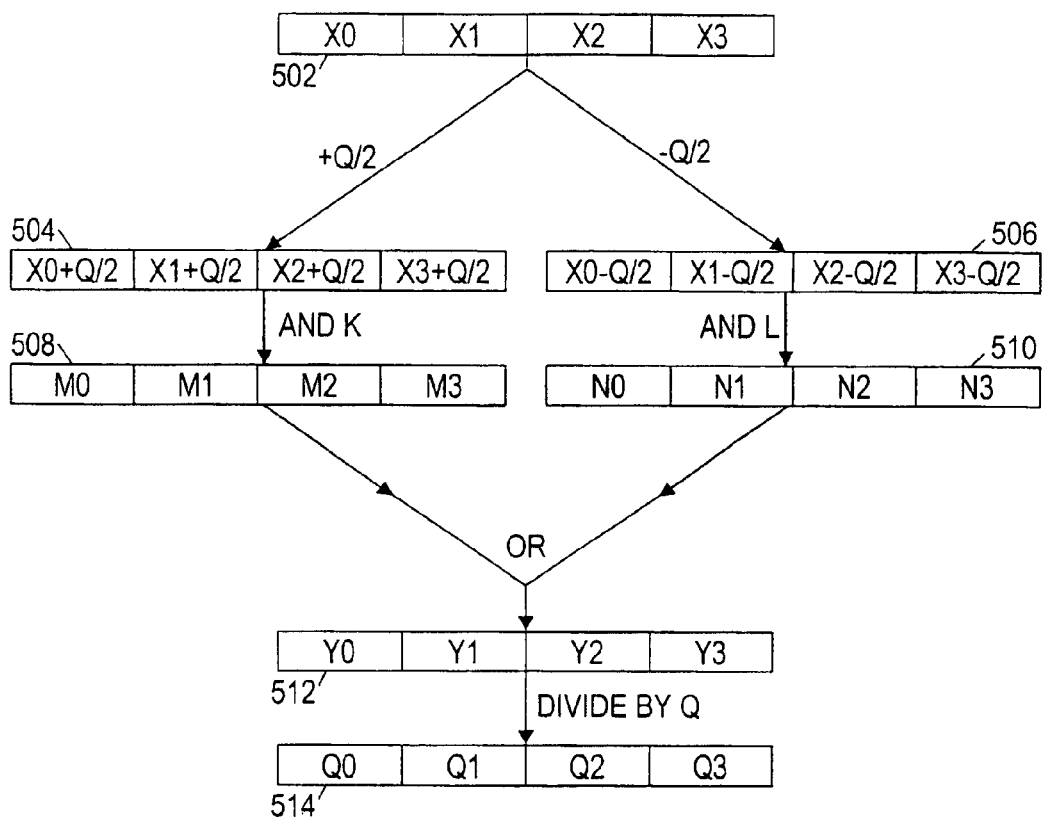
FIG. 5 shows a dataflow diagram of a SIMD quantization method.

In a system performing video compression, the quantization function must be performed repeatedly with quantization step sizes that may vary from application to application. To improve the effective speed with which quantizations are performed, the quantization function may be implemented using SIMD instructions to perform multiple quantizations in parallel. FIG. 5 illustrates one such implementation.

Register 502 in FIG. 5 contains four 16-bit integers X0, X1, X2 and X3, that are to be quantized according to the function of FIG. 4. Half of the quantization step Q is added to each of the integers, as shown by register 504, and half of the quantization step is subtracted from each of the integers, as shown by register 506. The additions can be performed in parallel using a SIMD instruction, as can the subtractions.

The addition of the half-quantization step is desired for only the positive input values, so all the results from the negative values are screened out. Here the screening is performed using a comparison operation. The PCMPGTW instruction is a SIMD instruction that compares each of the values in register 502 to corresponding values in another set of values, and sets the result values K to all ones (for those values greater than the other set of values) or to all zeros (for those values less than the other set of values). It is noted that setting K to all ones is equivalent to setting K equal to -1 using two's-complement binary notation. Here, the second set of values is chosen to be 0, so that K0=0 if X0≦0, 0xFFFF otherwise
K1=0 if X1≦0, 0xFFFF otherwise
K2=0 if X2≦0, 0xFFFF otherwise
K3=b 0if X3≦0, 0xFFFF otherwise Subsequently, these values [K0:K1:K2:K3] are logically ANDed with the corresponding values in register 504 to obtain the values in register 508. The values obtained are:

M0=0 if X0≦0, (X0+Q/2) otherwise
M1=0 if X1≦0, (X1+Q/2) otherwise
M2=0 if X2≦0, (X2+Q/2) otherwise
M3=0 if X3≦0, (X3+Q/2) otherwise This screens out the results for the negative input values.

Similarly, the subtraction of the half-quantization step is desired for only the negative input values, so all the positive values are screened out. The screening is again performed using the PCMPGTW instruction to compare each of the values of register 502 to 0 to obtain result values L:

L0=0 if X0>0, 0xFFFF otherwise
L1=0 if X1>0, 0xFFFF otherwise
L2=0 if X2>0, 0xFFFF otherwise
L3=0 if X3>0, 0xFFFF otherwise Subsequently, these result values are logically ANDed with the values in register 506 to obtain the values in register 510. The values obtained are:

N0=0 if X0>0, (X0−Q/2) otherwise
N1=0 if X1>0, (X1−Q/2) otherwise
N2=0 if X2>0, (X2−Q/2) otherwise
N3=0 if X3>0, (X3−Q/2) otherwise This screens out the results for the positive input values.

The values in registers 508 and 510 are logically ORed together in parallel to obtain the values in register 512:

Y0=(X0−Q/2) if X0<0, (X0+Q/2) otherwise
Y1=(X0−Q/2) if X0<0, (X0+Q/2) otherwise
Y2=(X0−Q/2) if X0<0, (X0+Q/2) otherwise
Y3=(X0−Q/2) if X0<0, (X0+Q/2) otherwise The values in register 512 are quantized by dividing by quantization step Q. The resulting values in register 514 are the (truncated) integer quotients. This step may be performed by converting to floating point, dividing by quantization step Q, and converting back to integer.

The following subroutine excerpt implements the described quantization function using MMX and 3DNow! instructions:

```
1   cvtsi2ss   mm0, Q            ;put quant step Q in mm0 in single FP
2   rcpss      mm1, mm0          ;mm1 = 1/Q
3   cvtsi2ss   mm2, 2            ;get ready to divide by 2
4   divss      mm0, mm2          ;mm0 = Q/2 in single FP form
5   cvtss2si   mm2, mm0          ;mm2 = Q/2 in integer form
6   pshufw     mm0, mm2, 0       ;mm0 = [Q/2:Q/2:Q/2:Q/2]
7   movq       mm2, shortmask    ;mm2=0x0000ffff0000ffff
8   movq       mm3, *InpBfr      ;put [X0:X1:X2:X3] in mm3
9   movq       mm4, mm3          ;mm4=[X0:X1:X2:X3]
10  movq       mm5, mm3          ;mm5=[X0:X1:X2:X3]
11  pxor       mm6, mm6          ;mm6=0
12  pcmpgtw    mm5, mm6          ;mm5=[K0:K1:K2:K3], K=(X>0 ? 0xFFFF: 0)
13  pcmpgtw    mm6, mm4          ;mm6=[L0:L1:L2:L3], L=(X<=0? 0xFFFF: 0)
14  paddsw     mm3, mm0          ;mm2=[X0+Q/2:X1+Q/2:X2+Q/2:X3+Q/2]
15  psubsw     mm4, mm0          ;mm3=[X0−Q/2:X1−Q/2:X2−Q/2:X3−Q/2]
```

-continued

| | | | |
|---|---|---|---|
| 16 | pand | mm3, mm5 | ;mm3=[M0:M1:M2:M3], M=(X>0 ? X+Q/2 : 0) |
| 17 | pand | mm4, mm6 | ;mm4=[N0:N1:N2:N3], N=(X<=0? X−Q/2 : 0) |
| 18 | por | mm3, mm4 | ;mm3=[Y0:Y1:Y2:Y3], Y=M+N |
| 19 | movq | mm4, mm3 | ;mm4=[Y0:Y1:Y2:Y3] |
| 20 | psrlq | mm4, 16 | ;mm4=[0:Y0:Y1:Y2] |
| 21 | pi2fw | mm5, mm3 | ;mm5=[ Y1 : Y3 ] in FP form |
| 22 | pfmul | mm5, mm1 | ;mm5=[Y1/Q:Y3/Q] |
| 23 | pf2iw | mm3, mm5 | ;mm3=[Y1/Q:Y3/Q] in 32bit integer form |
| 24 | pand | mm3, mm2 | ;mm3=[0:Y1/Q:0:Y3/Q] 16 bit int form |
| 25 | pi2fw | mm6, mm4 | ;mm6=[Y0:Y2] in FP form |
| 26 | pfmul | mm6, mm1 | ;mm6=[Y0/Q:Y2/Q] divide |
| 27 | pf2iw | mm4, mm6 | ;mm4=[Y0/Q:Y2/Q] 32 bit int form |
| 28 | pand | mm4, mm2 | ;mm4=[0:Y0/Q:0:Y2/Q] 16 bit int form |
| 29 | psllq | mm4, 16 | ;mm4=[Y0/Q:0:Y2/Q:0] shift left |
| 30 | por | mm3, mm4 | ;mm3=[Y0/Q:Y1/Q:Y2/Q:Y3/Q] |
| 31 | movq | *OutBfr, mm3 | ;store quantized results |

This excerpt is now described in detail. For more detail on the instructions, refer to *Intel Architecture Software Developer's Manual Volume 2: Instruction Set Reference*, published in 1999 by Intel. This manual is hereby incorporated herein by reference.

The first instruction loads the mm0 register with the quantization step Q in single precision floating point (single FP) format. The second instruction calculates 1/Q and stores the result in the mm1 register in single FP format. The third instruction loads the mm2 register with a value of 2.0. The fourth instruction calculates Q/2 and stores the result in the mm0 register in single FP format. The fifth instruction converts Q/2 into integer format and stores it in the mm2 register. The sixth instruction packs four copies of Q/2 into the mm0 register. The seventh instruction loads an integer mask into the mm2 register for later use. These instructions have now initialized the mm0, mm1 and mm2 registers. The remaining instruction may be implemented as a loop which relies on these initialized registers, so that these first seven instructions do not necessarily have to be repeated.

The eighth instruction loads the mm3 register with four input values [X0:X1:X2:X3] from an input buffer in memory. The ninth and tenth instructions copy these input values to the mm4 and mm5 registers. The eleventh instruction lears the mm6 register. The twelfth instruction compares the input values to zero and accordingly determines the K values discussed above. The thirteenth instruction compares zero to the input values and accordingly determines the L values discussed above. The fourteenth instruction adds Q/2 to each of the input values in the mm3 register, and the fifteenth instruction subtracts Q/2 from each of the input values in the mm4 register. The sixteenth instruction sets any results from negative input values in the mm3 register to zero. The seventeenth instruction sets any results from positive input values in the mm4 register to zero. The eighteenth instruction adds the mm4 register values to the mm3 register values. The nineteenth instruction copies the mm3 register values to the mm4 register. The twentieth instruction shifts the values in the mm4 register right by 16 bits.

The twenty-first instruction converts the first and third integers (low 16 bits) of the mm3 register into single FP format in the mm5 register. The twenty-second instruction multiplies the mm5 register values by 1/Q. The twenty-third instruction converts the quotient into 32-bit integer format in the mm3 register. The twenty-fourth instruction uses the mask to trim the 32-bit integer format into a 16-bit integer format. The twenty-fifth through the twenty-eighth instructions repeat this process on the shifted second and fourth integers in the mm4 register, and the twenty-ninth instruction shifts the trimmed integers back to the high 16 bits in the mm4 register.

The thirtieth instruction combines the high and low 16 bit integers to pack the mm3 register. Finally, the thirty-first instruction stores the quantized values to an output buffer in memory.

It is noted that several variations of the subroutine described above are contemplated. For example, the execution order of the instructions may be rearranged to some extent, and in some cases different instructions may be used to achieve the same effect. The description of FIG. 5 and the subroutine is not intended to exclude such variations.

Figure 2:
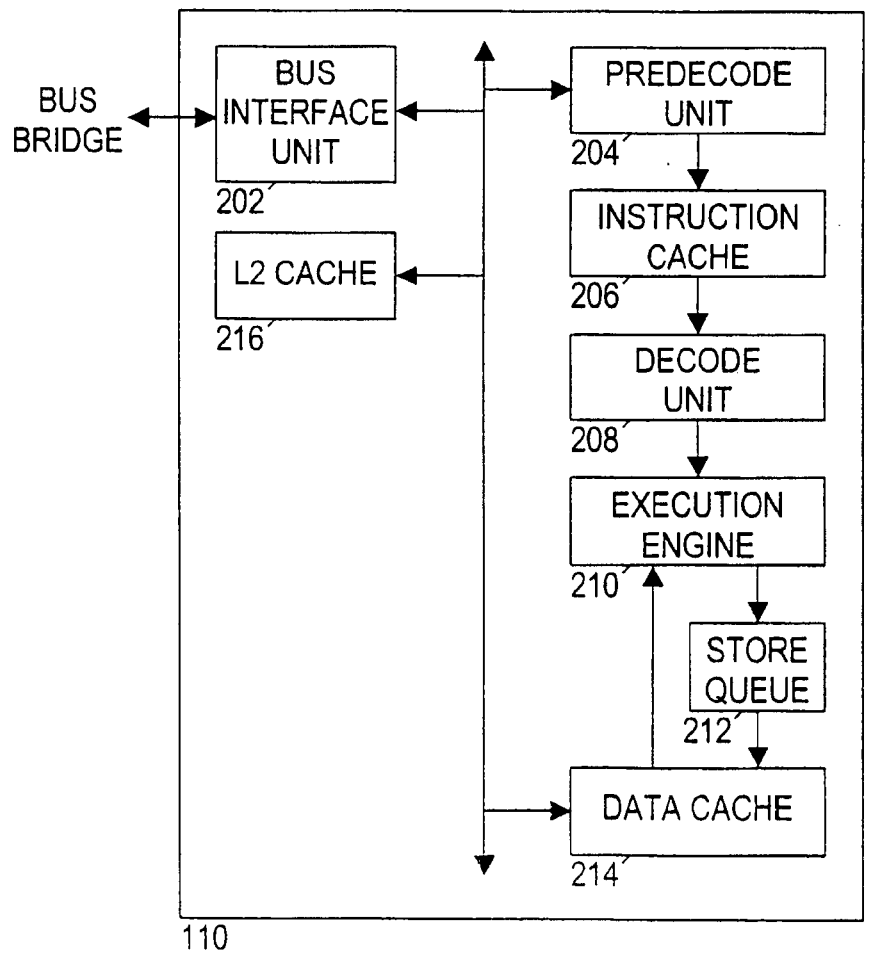
FIG. 2 shows one embodiment of a microprocessor.
Figure 3:
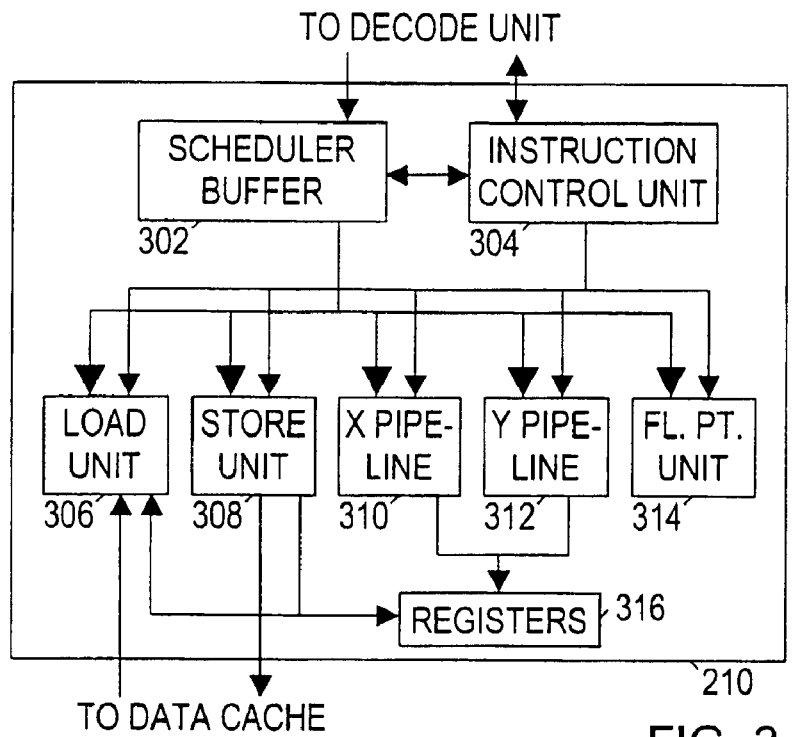
FIG. 3 shows one embodiment of an execution engine within a microprocessor.

It is further noted that the transform methods described herein may be performed by a computer system as shown in FIGS. 1–3 or a variant thereof Specifically, the methods may be implemented in software stored in memory 112 and executed by microprocessor 110 to process multimedia data for presentation of images via a display or sound via a speaker. During the compression of multimedia data, blocks of data are transformed and the resulting coefficients are quantized. Thus the quantizantion method may advantageously be employed to convert data indicative of images or sounds into quantized data indicative of similar images or sounds.

The transform methods described herein may advantageously be used to provide for, among other things, the display of video data or playback of audio data. In various embodiments, the transform methods described in conjunction with FIGS. 3–5 may be embodied by software instructions received, sent or stored upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A method of quantizing multiple input values using a microprocessor having an instruction set that includes SIMD instructions, wherein the method comprises:

receiving a set of input values Xi, wherein said input values are indicative of a first image; and operating on the set of input values to produce a set of quantized values indicative of a second image substantially similar to the first image, wherein said operating includes determining a set of values Ki, wherein each value Ki is expressible as $$Ki = \begin{cases} -1 & \text{if } Xi > 0 \\ 0 & \text{if } Xi \leq 0 \end{cases}.$$

2. The method of claim 1, wherein said determining a set of values Ki is performed in parallel by a PCMPGTW instruction that compares each of the input values to zero.

3. The method of claim 1, further comprising:
adding half a quantization step Q to each of the set of input values Xi to produce a set of sum values Si, wherein Si is expressible as Si=Xi+(Q/2).

4. The method of claim 3, wherein said adding is performed in parallel by a PADDSW instruction.

5. The method of claim 3, further comprising:
logically combining the set of sum values Si with the set of values Ki to obtain a set of values Mi, wherein the set of values Mi is expressible as:

$$Mi = \begin{cases} Xi+Q/2 & \text{if } Xi > 0 \\ 0 & \text{if } Xi \leq 0 \end{cases}.$$

6. The method of claim 5, wherein said logical combining is performed in parallel by a PAND instruction.

7. The method of claim 5, further comprising:
determining a set of values Ni, wherein the set of values Ni is expressible as:

$$Ni = \begin{cases} 0 & \text{if } Xi > 0 \\ Xi-Q/2 & \text{if } Xi \leq 0 \end{cases}.$$

8. The method of claim 7, further comprising:
joining the set of values Mi with the set of values Ni to determine a set of prequantization values Yi, wherein the set of prequantization values Yi is expressible as:

$$Yi = \begin{cases} Xi+Q/2 & \text{if } Xi > 0 \\ Xi-Q/2 & \text{if } Xi \leq 0 \end{cases}.$$

9. The method of claim 8, wherein the combining is performed in parallel by a POR instruction.

10. The method of claim 8, further comprising:
converting a subset of prequantization values to floating point format prequantization values;
dividing the floating point format prequantization values by quantization step Q to produce scaled values; and
transforming the scaled values into integer format to obtain said quantized values.

11. The method of claim 10, wherein said converting is performed in parallel by one or more PI2FW instructions, and wherein said transforming is performed in parallel by one or more PF2IW instructions.

12. The method of claim 10, wherein said operating, adding, combining, determining, joining, converting, dividing, and transforming are each performed by a single-instruction-multiple-data (SIMD) instruction.

13. A method of quantizing multiple input values using a microprocessor having an instruction set that includes SIMD instructions, wherein the method comprises:
receiving a set of input values;
determining a set of sum values by adding half of a quantization step to each of the input values;
determining a set of positive input sum values by replacing any sum values produced from non-positive input values in the set of sum values with zero;
determining a set of difference values by subtracting half of a quantization step from each of the input values;
determining a set of non-positive input difference values by replacing any difference values produced from positive input values in the set of difference values with zero;
adding corresponding values from the set of positive input sum values and the set of non-positive input difference values to produce a set of prequantization values; and
calculating an integer quotient of each of the prequantization values divided by the quantization step.

14. The method of claim 13, wherein said calculating includes:
converting a subset of the prequantization values into floating point format;
separately converting a subset of remaining prequantization values into floating point format;
determining a first set of floating point quotient values from the subset of prequantization values in floating point format;
determining a second set of floating point quotient values from the subset of remaining prequantization values in floating point format;
transforming the first set of floating point quotient values into a first set of integer quotient values; and
transforming the second set of floating point quotient values into a second set of integer quotient values.

15. The method of claim 14, wherein said calculating further includes:
converting the first set of integer quotient values into short integer quotient values;
converting the second set of integer quotient values into short integer quotient values; and
combining the first and second sets of short integer quotient values into one register.

16. A method of quantizing multiple input values using a microprocessor having an instruction set that includes SIMD instructions, wherein the method comprises:
receiving multiple input values into a first register;
copying the multiple input values into a second register;
copying the multiple input values into a third register;
using a SIMD compare instruction to compare the third register to zero, thereby obtaining a binary mask in the third register for screening out non-positive input-values;
using a SIMD add instruction to add, in parallel, half of a quantization step to each of the input values in the first register to obtain multiple sum values in the first register;
using a SIMD subtract instruction to subtract, in parallel, half of a quantization step from each of the input values in the second register to obtain multiple difference values in the second register;
using a SIMD logical and instruction with the binary mask in the third register to replace, in parallel, any sum values in the first register determined from non-positive input values with zero; and
using a SIMD logic instruction to replace, in parallel, any difference values in the second register determined from positive input values with zero.

17. The method of claim 16, further comprising:
using a SIMD logical or instruction to combine, in parallel, each of the first register values with the second register values to obtain a set of pre-quantization values.

18. The method of claim 17, further comprising:

copying the prequantization values so that both the first and second registers contain the prequantization values;

using a SIMD float instruction to convert, in parallel, the prequantization values in low-order words of the first register to floating point format;

using a shift instruction to shift the prequantization values in high-order words of the second register to low-order words of the second register; and using a SIMD float instruction to convert, in parallel, the prequantization values in the low order words of the second register to floating point format.

19. The method of claim 18, further comprising:

using a SIMD multiply instruction to multiply, in parallel, the floating point prequantization values in the first register with a reciprocal quantization step value to obtain floating point quotient values in the first register;

using a SIMD multiply instruction to multiply, in parallel, the floating point prequantization values in the second register with a reciprocal quantization step value to obtain floating point quotient values in the second register;

using a SIMD int instruction to convert, in parallel, the floating point quotient values in the first register into integer values in the first register; and using a SIMD int instruction to convert, in parallel, the floating point quotient values in the second register into integer values in the second register.

20. The method of claim 17, wherein the first, second and third registers each store four integer values for the SIMD instructions to operate on.

21. A computer system comprising:

an execution unit having an instruction set that includes SIMD instructions; and a memory coupled to the execution unit, wherein the memory stores software instructions executable by the execution unit to implement a method of quantizing multiple input values, wherein the method includes:

receiving a set of input values Xi, wherein said input values are indicative of a first image; and operating on the set of input values to produce a set of quantized values indicative of a second image substantially similar to the first image, wherein said operating includes determining a set of values Ki, wherein each value Ki is expressible as.

$$Ki = \begin{cases} -1 & \text{if } Xi > 0 \\ 0 & \text{if } Xi \le 0 \end{cases}.$$

22. A carrier medium comprising software instructions executable by a microprocessor having an instruction set that includes SIMD instructions to implement a method of quantizing multiple input values, wherein the method comprises:

receiving a set of input values Xi, wherein said input values are indicative of a first image; and operating on the set of input values to produce a set of quantized values indicative of a second image substantially similar to the first image, wherein said operating includes determining a set of values Ki, wherein each value Ki is expressible as.

$$Ki = \begin{cases} -1 & \text{if } Xi > 0 \\ 0 & \text{if } Xi \le 0 \end{cases}.$$

* * * * *